United States Patent

Okada et al.

[11] Patent Number: 6,126,720
[45] Date of Patent: Oct. 3, 2000

[54] METHOD FOR SMELTING NOBLE METAL

[75] Inventors: Satoshi Okada; Hiromi Mochida, both of Omiya, Japan

[73] Assignee: Mitsubishi Materials Corporation, Tokyo, Japan

[21] Appl. No.: 09/180,272

[22] PCT Filed: Jun. 4, 1998

[86] PCT No.: PCT/JP98/02479

§ 371 Date: Jan. 15, 1999

§ 102(e) Date: Jan. 15, 1999

[87] PCT Pub. No.: WO98/58089

PCT Pub. Date: Dec. 23, 1998

[30] Foreign Application Priority Data

Jun. 16, 1997 [JP] Japan .................................. 9-158170

[51] Int. Cl.[7] .................................................. C22B 11/00
[52] U.S. Cl. .............................. 75/714; 75/741; 75/744; 423/22; 423/27; 423/658.5; 205/569; 205/571
[58] Field of Search ........................... 75/741, 744, 714; 423/22, 27, 658.5; 205/568, 569, 571

[56] References Cited

U.S. PATENT DOCUMENTS 3,996,046  12/1976  Hoffmann et al. ........................ 423/22
4,229,270  10/1980  Subramanian et al. ................. 204/109
5,942,024   8/1999  Yoshifumi et al. ....................... 75/371

FOREIGN PATENT DOCUMENTS 60-224720  11/1985  Japan .
63-500875   3/1988  Japan .
1-270511   10/1989  Japan .
8-260065   10/1996  Japan .

OTHER PUBLICATIONS

Derwent Abstract 1981–36389D for DD 146712 Feb. 25, 1981.

Primary Examiner—Melvyn Andrews
Assistant Examiner—Tima McGuthry-Banks
Attorney, Agent, or Firm—Oblon, Spivak, McClelland, Maier & Neustadt, P.C.

[57] ABSTRACT

A method for refining noble metals has a silver treating process including a nitric acid leaching step of silver, a purification step of the leaching solution, an electrolytic decomposition step of silver, and a recycling step after the electrolytic decomposition, wherein in the purification step, lime is added in order to precipitate the metallic impurities, such as selenium, tellurium, bismuth, and copper, by neutralization of the leaching solution, and in the recycling step, sulfuric acid is added to the solution after electrolytic decomposition to regenerate nitric acid for recycling use by precipitation of calcium in the solution as gypsum. Preferably, the refining method has a gold recovery process, as well as the silver treating process, wherein the residue of the nitric leaching of the crude silver is dissolved by chlorination and gold is recovered from the leaching solution by solvent extraction or reductive precipitation. High purity gold and silver can be readily obtained, and the refining time for gold is significantly shorter than that in conventional methods.

8 Claims, 2 Drawing Sheets

METHOD FOR SMELTING NOBLE METAL

TECHNICAL FIELD

The present invention relates to a method for refining noble metals for the recovery of purified silver and preferably simultaneously gold by effectively treating crude silver which is obtained from electrolytic slime or by dry refining of copper or lead.

BACKGROUND ART

Electrolytic slime of copper or lead contains large amounts of silver and gold, which have been conventionally recovered. In a known electrorefining process, silver electrolytic decomposition is performed using crude silver obtained from electrolytic slime or by dry refining of copper or lead as an anode to collect purified silver, whereas the anode slime formed in the silver electrolytic decomposition is dissolved with nitric acid to remove impurities and the residual gold, which is not dissolved, is cast as an anode to obtain purified gold by gold electrolytic decomposition.

In another known method, electrolytic slime of copper or lead is leached with hydrochloric acid containing an oxidizing agent, and gaseous $SO_2$ is introduced into the leaching solution for the reductive precipitation of gold. Since the reductive process can reduce 80% of gold in the solution, the residual unreduced gold is recycled in the former step for re-reduction treatment.

A wet refining process for recovering gold and silver with high efficiency is known in Japanese Patent Laid-Open No. 46-4775 in which copper electrolytic slime is subjected to a complicated dissolution operation at a high temperature. For example, the copper slime is leached with sulfuric acid in an autoclave with application of pressure, the leaching residue is chlorinated for recovering gold in the solution by solvent leaching whereas the residue after chlorination is leached with ammonia to dissolve silver as an ammonia complex which is reduced with glucose or the like to form crude silver.

The above-mentioned electrorefining process has the following problems, that is, (1) the time required for gold refining is prolonged because of gold electrolysis after silver electrolysis, resulting in low gold productivity; and (2) the anode casting operation for electrolysis requires a lot of time and is automated with difficulty, resulting in low workability and productivity.

The method for reducing silver in the leaching solution with gaseous $SO_2$ has the following problems, that is, (1) since the leaching solution contains large amounts of platinum and palladium, the reduction rate of gold must be suppressed to approximately 80% to maintain the quality and thus 20% of the residue must be subjected to retreatment, resulting in a low treating efficiency; and (2) it is difficult to control gaseous $SO_2$, and the quality of gold will decrease significantly if the conditions change.

The conventional method for obtaining reduced silver by ammonia leaching has the following problems, that is, (1) since large amounts of impurities such as lead are contained in the slime, the removal treatment for such impurities is significantly expensive; (2) copper and lead contain large amounts of impurities regardless of a complicated series of steps from ammonium leaching to reduction.

For solving these problems in the conventional processes, it is an object of the present invention to provide a method for refining noble metals which is capable of refining with ease crude silver by a relatively simple treating process, and of reducing the refining time by simultaneous silver refining and gold recovery steps.

DISCLOSURE OF INVENTION

The present invention solves the problems in conventional processes using anodes by electrorefining of silver from a leaching solution as an electrolytic solution in which crude silver is dissolved in nitric acid, instead of electrolytic refining using an anode formed by casting of silver. A method for purifying the leaching solution and a treating step after electrolytic decomposition are improved to effectively remove impurities. Further, in addition to the treating system for the electrowinning, a treating system for recovering gold by chlorinating dissolution of the residue of the nitric leaching is provided to recover gold within a reduced time.

Accordingly, the present invention relates to (1) a method for refining noble metals including a leaching step for dissolving crude silver with nitric acid, a purification step for removing metallic impurities in a leaching solution by precipitation, an electrolytic decomposition step for electrolyzing the purified solution to collect silver by precipitation, and a recycling step for recycling the solution after the electrolytic decomposition to the leaching step, wherein in the purification step, lime is added in order to precipitate the metallic impurities by neutralization of the nitric leaching solution, and in the recycling step, sulfuric acid is added to the solution after electrolytic decomposition to regenerate nitric acid for recycling use by precipitation of calcium in the solution as gypsum.

In the refining method in accordance with the present invention, (2) an oxidizing agent is added to the leaching solution in the leaching (primary leaching) step of the crude silver to precipitate platinum elements in the solution and the filtrate after solid-liquid separation is fed to the purification step. Particularly, (3) potassium permanganate is used as the oxidizing agent to precipitate platinum elements in a molar amount corresponding to 6 to 24 times that of platinum in the leaching solution, a molar amount corresponding to 4 to 16 times that of palladium, or a molar amount corresponding to the sum of these molar amounts of contained platinum and palladium. In the leaching of crude silver, potassium permanganate is added to the primary leaching solution to precipitate the platinum elements. Since the platinum elements are separated from the primary leaching solution, the load of the purification step can be reduced in the silver electrolytic decomposition.

In the refining method in accordance with the present invention, (4) an iron compound is added into the nitric leaching solution (primary leaching solution) in the purification step to precipitate tellurium and/or bismuth with iron hydroxide in the solution with a pH of less than 3 to 4 and then to remove copper in the solution with a pH of 4 to 5 by precipitating as copper hydroxide. Two steps of pH adjustment remove metallic impurities in the solution and thus a high purity of silver is recovered by precipitation.

The refining method in accordance with the present invention includes a recovery system for gold in addition to the refining system for the crude silver. Accordingly, the present invention relates to a method for refining noble metals including a silver treating step for electrowinning of silver by any one of the above-mentioned methods (1) to (4) and a gold recovery step for recovering gold after dissolving by chlorination (secondary leaching) the residue of the primary leaching (the residue of the nitric dissolution) of the crude silver.

Since the gold treating system is provided in addition to the refining system for the crude silver, the refining time of gold is significantly reduced, resulting in significant reduction of refining costs.

In the gold recovery step in the refining method of the present invention, for example, (6) gold is recovered from the secondary leaching solution by solvent leaching. Alternatively, (7) in the gold recovery step, the residue of the primary leaching of the crude silver is dissolved by chlorination in the presence of oxalic acid with an acid concentration of 0.1 N to 1 N to separate platinum elements by leaching (secondary leaching), while the residue of the secondary leaching is dissolved by chlorination to leach gold (tertiary leaching) and then a reducing agent is added for reductive precipitation of gold. Preferably, (8) in the gold recovery step the secondary leaching is performed using oxalic acid and hydrochloric acid containing sodium chloride, the tertiary leaching is performed using hydrogen peroxide with hydrochloric acid, gaseous chlorine with hydrochloric acid, or hypochlorous acid, and then oxalic acid is added to the tertiary leaching solution for reductive precipitation of gold.

In each embodiment of the refining method of the present invention, (9) crude silver obtained from slime of copper electrolytic decomposition or lead electrolytic decomposition, or obtained by dry refining can be used.

BEST MODE FOR CARRYING OUT THE INVENTION

Figure 1:
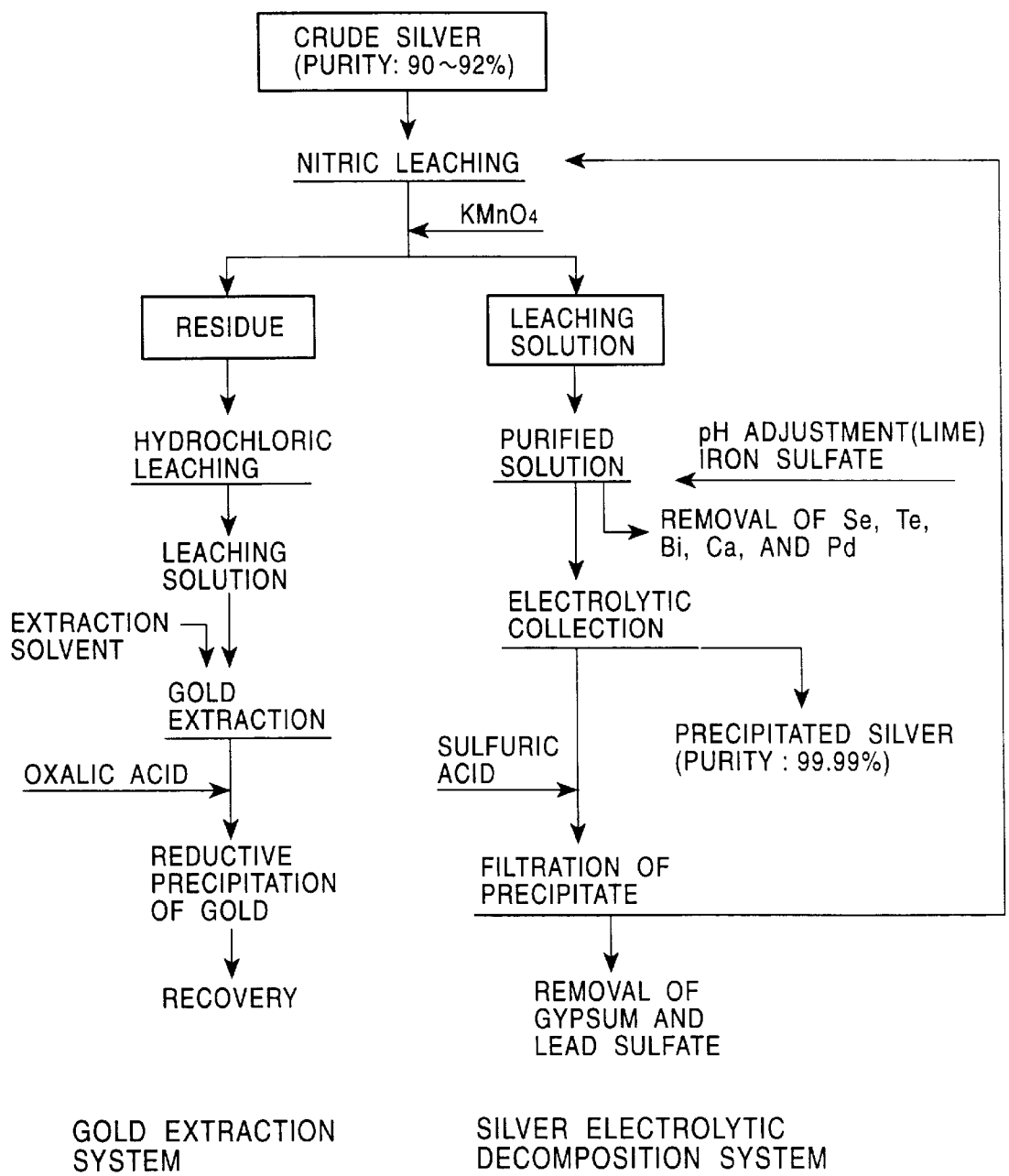
FIG. 1 is a flow chart illustrating the outline of a refining method in accordance with the present invention.

The present invention will now be described in detail with reference to the embodiments. As shown in the drawings, the refining method in accordance with the present invention includes a treating system for refining crude silver by electrolytic decomposition and a treating system for recovering gold in parallel with this. Each treating system is described below.

(I) Treating System for Refining Crude Silver

The refining method in accordance with the present invention has an electrolyzing refining system for crude silver including a leaching step (primary leaching) for dissolving crude silver with nitric acid, a purifying step for removing by precipitation metallic impurities in the leaching solution, an electrolytic decomposition step for electrolyzing the purified solution to collect silver by precipitation, and a step for recycling the solution after the electrolytic decomposition to the leaching step.

Usable crude silver is obtained from the slime of copper or lead electrolytic decomposition or by dry refining. The step for producing the crude silver is not limited. For example, the slime of copper or lead electrolytic decomposition is leached with sulfuric acid under pressure, the residue formed by chlorination of the leaching solution is leached with ammonia, and the silver ammonium complex in the solution is reduced to produce crude silver.

Leaching Step

In the leaching step, nitric acid is used to dissolve the crude silver. The crude silver is shaped into granules with a particle size of approximately 5 mm so that it is easily dissolved into nitric acid to form silver nitrate. The concentration of nitric acid may be approximately 1 N. Silver is easily dissolved with nitric acid and the solution after purification can be used as an electrolytic decomposition solution. The granulated crude silver enables automated transport and does not require a casting step of the crude silver for forming an anode; hence the overall electrolytic decomposition process including removal of the electrolytic slime can be automated.

When the nitric leaching step is performed at a temperature of 60 to 80° C., silver can be substantially completely dissolved within a short time, for example, approximately 2 hours for a sufficient amount of nitric acid to the crude silver. The nitric leaching solution is fed to the purification step.

Leaching Step: Separation of Platinum Elements

In the nitric leaching step (primary leaching), potassium permanganate is added to the leaching solution and solid-liquid separation is performed to obtain a primary leaching solution not containing platinum elements. Most parts of platinum elements, such as platinum and palladium, contained in the nitric leaching solution form nitrite complex ions. When oxidizing these with potassium permanganate, platinum and palladium precipitate as hydroxides. When any general oxidizing agent such as hydrogen peroxide is used instead of potassium permanganate, the platinum elements cannot be satisfactorily removed due to insufficient precipitation.

Potassium permanganate may be added in an amount that is sufficient for oxidization from nitrite complex ions to nitrate ions. Particularly, the preferable amount is one to four times by mole of an amount required for the oxidation. Since nitrite complex ions $[Pt(NO_2)_6]^{2-}$ and $[Pd(NO_2)_4]^{2-}$ of platinum and palladium are coordinated with six nitrate ions and four nitrate ions, respectively, potassium permanganate in at least an amount corresponding to 6 times by mole of platinum and 4 times by mole of palladium is required for oxidation of these ions. Preferably, potassium permanganate is 1 to 4 times by mole of this amount, that is, 6 to 24 times by mole of the platinum content in the solution and 4 to 16 times by mole of the palladium content in the solution. Potassium permanganate may be added in an amount within the above-mentioned molar range to the platinum content or the palladium content in the nitric solution.

When both platinum and palladium are contained, it is added in an amount corresponding to the total of the molar ranges. For example, if the solution contains X mole of platinum and Y mole of palladium, 6X mole and 4Y mole of potassium permanganate are required for oxidizing platinum and palladium nitrite complex ions, respectively. Thus, the total becomes 1 to 4 times of (6X+4Y). If the amount of potassium permanganate is less than the above-mentioned amount, platinum or palladium will not satisfactorily precipitate. If the amount of potassium permanganate is larger than the above-mentioned amount, platinum or permanganate ions and the potassium concentration will be undesirably increased in the solution.

The pH of the nitric leaching solution is adjusted to 1 or more before potassium permanganate is added. By adjusting the pH of the nitric leaching solution to 1 or more, the nitrite complex is decomposed to cause precipitation of free platinum or palladium as a compound. The pH is preferably 2 or more, and more preferably 2.5 or more; however, a pH of higher than 5 is undesired because of conversion of silver in the solution into silver oxide. The temperature of the solution is preferably 80° C. or more. The temperature of the solution during the nitric leaching without adding potassium permanganate ranges from 60° C. to 80° C., as described above; however, it is preferable to adjust the temperature of the solution to 80° C. or more when simultaneously separating platinum elements by adding potassium permanganate during the nitric leaching. When the nitric leaching solution contains platinum, a temperature of the solution of 60° C. or less does not cause platinum to precipitate.

Purification Step

In the purification step, lime (quick lime and slaked lime) is added before the leaching solution is neutralized to a given pH value so that metallic impurities in the solution are removed by precipitation. If the nitric leaching solution (silver nitrate solution) contains ions of metallic impurities, such as selenium, tellurium, bismuth and copper, the pH adjustment is performed in two stages and iron is added for co-precipitation in order to effectively remove these impurities. Particularly, lime is added to neutralize the nitric leaching solution to a pH value of 3 to 4, and preferably near 3.5 while iron sulfate is added so that selenium, tellurium and bismuth in the solution are converted into hydroxides and precipitated together with iron hydroxide. Lime is further added to adjust the pH value of the leaching solution to 4 to 6 and preferably approximately 4 to 5 in order to precipitate copper in the solution as hydroxide. Selenium, tellurium and bismuth precipitate at a pH value of near 3.5, whereas copper does not precipitate. Thus, the pH is increased by adding the lime to precipitate copper. The precipitates are removed from the solution by solid-liquid separation.

When potassium permanganate is not added and when palladium is dissolved in the leaching solution, palladium in the solution precipitates as a hydroxide together with copper by adjusting the pH value of the leaching solution to 4 to 6 and preferably 4 to 5 as in copper. Thus palladium can be removed together with copper by solid-liquid separation.

Electrolytic Decomposition Step

The pH of the nitric solution after removal of impurities by the purification step is adjusted and the solution is subjected to electrolytic decomposition to precipitate silver from the solution. A suitable pH of the electrolytic solution ranges from 0.8 to 1.5. Metallic silver precipitated by electrolytic decomposition deposits on the bottom of the vessel. If the acid concentration increases with silver precipitation, the precipitated silver is redissolved; hence it is preferable that slaked lime be added to adjust the pH of the nitric solution to the above range. Examples of preferred cathode materials include a stainless steel sheet, and examples of preferred anode materials include a pure titanium plate and a titanium plate coated with ruthenium oxide. It is preferred, in general, that the temperature of the electrolytic decomposition solution ranges from 37° C. to 42° C. and the current density be approximately 400 A/m$^2$. By the electrolytic decomposition, crude silver with a purity of 90 to 92% is purified to a purity of 99.99%.

Recycling Step

In the recycling step, sulfuric acid is added into the solution after the electrolytic decomposition to adjust the liquid property. That is, sulfuric acid is added into the solution after the electrolytic decomposition to precipitate calcium in the solution as gypsum so that nitric acid is recovered, and to precipitate lead as lead sulfate together with the gypsum. After removing the electrolytic decomposition solution by filtration, the nitric solution is recycled to the leaching step. Since nitric acid is recovered and recycled in such a manner, it is effectively used in the leaching step. Further, lead is removed from the solution, hence an extremely low amount of lead is accumulated in the solution which is recycled repeated times. Sulfate ions contained in the recycled nitric solution react with lead as an impurity contained in the crude silver to form lead sulfate that is removed as a precipitate during the nitric leaching.

(II) Treating System for Recovering Gold

The refining method of the present invention includes an extraction system for gold, as well as the above-mentioned refining system for silver. That is, silver is collected by the electrolytic decomposition step whereas the residue formed in the nitric dissolution (primary leaching) of the crude silver is dissolved by chlorination (secondary leaching) and then gold is recovered.

In the recovery step of gold, (A) gold is selectively recovered from the secondary leaching solution by solvent extraction, or (B) gold is reductively precipitated from a tertiary leaching solution after separating platinum elements by the secondary leaching.

(A) Recovery of Gold by Solvent Extraction

Secondary Leaching Step

The residue formed during the nitric dissolution (primary leaching) of the crude silver is dissolved in the presence of chlorine or hydrogen peroxide or with hypochlorous acid. The chlorination using chlorine and hydrogen peroxide helps dissolution of the residue of the primary leaching. A suitable reaction temperature is in the range from 60° C. to 75° C., and a suitable acid concentration in the solution is in the range from 2 N to 3 N. When using hydrogen peroxide with hydrochloric acid, it is desired that hydrochloric acid be used in an amount required for converting gold in the solution into gold chloride ($AuCl_4$) and maintaining the acid concentration in the solution to 2 N to 3 N, and hydrogen peroxide in an amount corresponding to 1.2 times the amount required for the oxidation of gold.

Solvent Extraction Step

A solvent for extracting gold is added to the hydrochloric elute containing leached gold by the chlorination to extract gold. Dibutyl carbitol or the like can be used as the solution for extracting gold. In the extraction conditions, it is preferable to control the acid concentration in the solution to 1 N to 3 N and the volume ratio of the extracting solvent to the elute to 0.5 to 1.

After extraction of gold with the organic solvent, hydrochloric acid is added to the solvent to clean the impurities in the solvent, and a reducing agent is added to the organic solvent containing dissolved gold to precipitate gold by selective reduction. A suitable reducing agent is oxalic acid.

According to the solvent extraction, gold is separated from the metallic impurities by using a solvent having high selectivity for gold, even if small amounts of platinum elements and other metallic impurities are contained in the secondary leaching solution. Thus, gold can be easily recovered without repeating separation of the metallic impurities during the secondary leaching.

(B) Recovery of Gold by Reductive Precipitation

Figure 2:
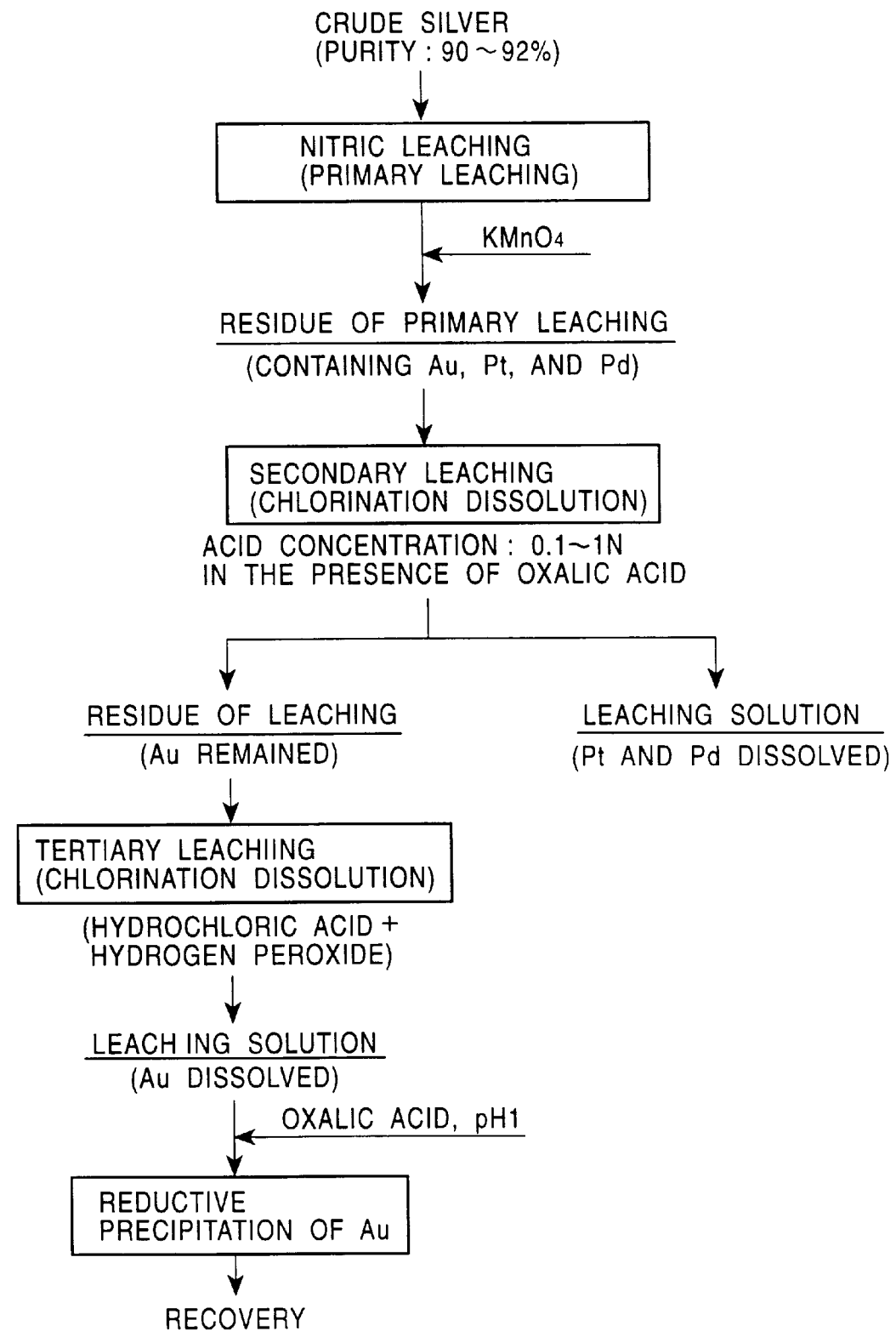
FIG. 2 is a flow chart illustrating the steps of reductive precipitation in the gold recovery steps in accordance with the present invention.

Gold can be recovered from the leaching solution by reductive precipitation without using the solvent extraction. In order to improve the purity of the precipitated gold in this case, it is preferable that a step for separating metallic impurities be provided when the residue of the primary leaching is subjected to secondary leaching, and that gold be precipitated in a leaching solution obtained by tertiary leaching of the residue of the secondary leaching. FIG. 2 shows the recovery step of gold by the reductive precipitation.

Secondary Leaching Step

When the residue of the primary leaching contains platinum elements such as platinum and palladium as a result of oxidizing treatment with potassium permanganate in the primary leaching step, the residue of the primary leaching is dissolved by chlorination in the presence of oxalic acid (secondary leaching) to separate platinum and/or palladium from gold contained in the residue of the leaching.

The secondary leaching (chlorination dissolution) is performed within an acid concentration in the range from 0.1 N to 1 N in the presence of a small amount of oxalic acid. A usable chloride ion source is hydrochloric acid. If chloride ions over the above acid concentration range are required, it is preferred that a neutral salt such as sodium chloride be added together with hydrochloric acid. At an acid concentration of less than 0.1 N, the platinum elements are not sufficiently leached. On the other hand, at an acid concentration of more than 1 N, a considerable amount of gold is undesirably leached together with platinum and palladium because the suppression effect of leaching of gold by oxalic acid is insufficient.

The use of a small amount of oxalic acid is to suppress the leaching of gold. Oxalic acid is added in an amount that is sufficient to completely reduce gold contained in the residue.

It is preferred that the reaction temperature of the leaching step ranges from 75° C. to 90° C. The end point of the reaction can be detected by confirming that the oxidation potential of the solution becomes lower than the reduction potential of gold.

The platinum elements such as platinum and palladium contained in the residue are chlorinated and dissolved in the secondary leaching solution. Since gold remains in the residue of leaching, it can be separated from the platinum elements. Platinum and palladium in the leaching solution can be recovered as hydroxide precipitates by neutralization with sodium hydroxide or they can be recovered by platinum/palladium extraction treatment with ammonium chloride or a solvent.

Tertiary Leaching Step

The residue of the secondary leaching is dissolved by chlorination to leach gold (tertiary leaching). The chlorination dissolution can be performed as in the secondary leaching in the solvent extraction treatment. That is, it is preferably performed by a combination of hydrogen peroxide and hydrochloric acid, gaseous chlorine and hydrochloric acid, or hypochlorous acid. Dissolving the residue with hydrochloric acid in the presence of hydrogen peroxide or gaseous chlorine prompts the leaching of gold. The preferred reaction temperature is in the range from 60° C. to 80° C., and preferred acid concentration in the solution is in the range from 2 N to 11 N. When using hydrogen peroxide with hydrochloric acid, it is preferred that hydrochloric acid is used in an amount for oxidizing gold into gold chloride ($AuCl_4$) and for maintaining the acid concentration in the solution at 2 N to 11 N, and hydrogen peroxide in an amount 1.2 times that of the equivalent for the oxidation of gold. The end point of the reaction can be determined by confirming that the oxidation potential of the solution becomes higher than the dissolution potential of gold.

Reductive Precipitation Step

An alkaline such as sodium hydroxide is added to the solution obtained by chlorination dissolution of the residue (gold leaching solution), the solution is adjusted to a pH of approximately 1, and a reducing agent is added to precipitate gold by selective reduction. A pH of less than 0.5 causes a decreased reduction rate by oxalic acid and thus causes substantially a decreased reductive conversion. On the other hand, a pH of higher than 2 causes precipitation of impurities and thus undesired mixing with reduced gold.

A preferable reducing agent is oxalic acid. The reductive precipitation step can form gold with a purity of 99.99%. Use of a reducing agent, such as sodium sulfite or hydrazine, which is stronger than oxalic acid, causes simultaneous reductive precipitation of metallic impurities such as platinum and palladium slightly dissolved in the solution, and thus causes a decreased purity of gold.

EXAMPLE 1

One hundred grams of crude silver (quality level: gold 5%, silver 92%, copper 2%, and palladium 0.15%) was leached with 1 liter of 1-N nitric acid to form a nitric solution containing 92 g/l of silver, 2 g/l of copper, and 100 ppm of palladium. Slaked lime was added to the solution to adjust the pH to 6 so that hydroxides of copper and palladium precipitate. The precipitate was separated by filtration. The copper and palladium concentrations in the nitric solution after purification were 1.5 g/l and 20 ppm, respectively.

Nitric acid was added in the nitric leaching solution to adjust the pH to 1, and the solution was used as an electrolytic decomposition solution. Using a titanium plate as an anode and a stainless steel plate as a cathode, the solution was subjected to electrolytic decomposition at a solution temperature of 37° C. and a cathode current density of 400 $A/m^2$ for 7 hours, and 50 percent by weight of the silver content was collected. Slaked lime was continually added to maintain the pH of the solution to 1 during the electrolytic decomposition. As a result, precipitated silver having a purity of 99.99% was obtained with a current efficiency of 97%.

After the electrolytic decomposition, 25 ml of sulfuric acid was added to the solution to precipitate calcium ions in the solution as gypsum, and gypsum was separated by filtration. Silver corresponding to 2% of one in the solution was lost into the gypsum. The filtrate contained 25 g/l of calcium. Using the nitric solution after the electrolytic decomposition, 50 g of crude silver was dissolved and was subjected to collection by electrolytic decomposition under the above-mentioned conditions.

On the other hand, the residue formed in the nitric acid dissolution was dissolved with 2-N hydrochloric acid while blowing gaseous chlorine (flow rate: 0.05 l/min). 50 ml of the solution was put into contact with 50 ml of 100% dibutyl carbitol for 10 minutes to extract gold. Oxalic acid was added to the extracting solution to reduce gold. Gold with a purity of 99.99% was precipitated.

EXAMPLE 2

One hundred grams of crude silver (quality level: gold 5%, silver 92%, copper 2%, selenium 70 ppm, tellurium 10 ppm, bismuth 30 ppm and lead 500 ppm) was leached as in EXAMPLE 1. Into the primary leaching solution, 0.5 g of ferrous sulfate was added, and then slaked lime was added to adjust the pH to 3.5 so that selenium, tellurium and bismuth were precipitated together with ferrous hydroxide. The pH of the primary leaching solution was increased to 4.2 to precipitate copper as hydroxide. The precipitate was filtered. The contents of copper, selenium, tellurium, and bismuth in the filtrate after purification (nitric leaching solution) were 1.5 g/l, 2 ppm, less than 1 ppm, and 2 ppm, respectively.

Using the purified solution as an electrolytic decomposition solution, 40 g of silver was collected by electrolytic decomposition as in EXAMPLE 1. The purity of silver was 99.99% and the current efficiency was 97%.

After the electrolytic decomposition, 25 ml of sulfuric acid was added into the solution to precipitate lead ions in the solution as lead sulfate, and the precipitate was filtered.

Silver corresponding to 2% of one in the solution was lost into the gypsum. The concentrations of calcium and lead were 25 g/l and 20 ppm, respectively.

EXAMPLE 3

Silver was subjected to electrolytic decomposition as in EXAMPLE 1, while the residue of nitric acid dissolution was dissolved into a mixture of hydrogen peroxide and hydrochloric acid (HCl concentration 3 N, $H_2O_2$ concentration 1.2%) to leach gold. 100 ml of the hydrochloric acid solution (Au: 40 g/l) was put into contact with 40 ml of 100% dibutyl carbitol (DBC) for 10 minutes to extract gold. The DBC solution was washed with 1-N hydrochloric acid so that impurities in the solution migrate into the aqueous phase. Into the DBC solution, 100 ml of water, 4 g of sodium hydroxide, and 5 g of oxalic acid dehydrate were added, and the solution was stirred to 80° C. for 1 hour for reductive precipitation of gold. Gold with a purity of 99.99% was obtained. The residual concentration of gold in the aqueous solution was less than 1 ppm.

EXAMPLE 4

The pH of the nitric primary leaching solution (Ag: 100 g/l, Cu: 2 g/l, Pt: 50 ppm, and Pd: 350 ppm) was adjusted to 3. Next, 0.2 g of potassium permanganate was added to 50 ml of the primary leaching solution (the molar ratio of $KMnO_4$ to the total nitrite ions coordinating with Pt and Pd: 1). The solution was stirred at 80° C. for 1 hour. A blackish brown precipitate formed. The precipitate was filtered. The concentrations of elements in the filtrate were 100 g/l for Ag, 2 g/l for Cu, less than 1 ppm for Pt, and less than 1 ppm for Pd. Platinum and palladium were separated from the primary leaching solution. X-ray diffractometric analysis of the precipitate suggested that it contains palladium hydroxide and platinum hydroxide in amounts of 0.0175 g and 0.002 g, respectively.

EXAMPLE 5

The pH of the nitric primary leaching solution (Ag: 400 g/l, Cu: 8 g/l, Pt: 190 ppm, and Pd: 1.1 g/l) was adjusted to 3. Next, 0.8 g of potassium permanganate was added to 50 ml of the primary leaching solution (the molar ratio of $KMnO_4$ to the total nitrite ions coordinating with Pt and Pd: 1). The solution was stirred at 80° C. for 1 hour. A blackish brown precipitate formed. The precipitate was filtered. The concentrations of elements in the filtrate were 400 g/l for Ag, 8 g/l for Cu, less than 1 ppm for Pt, and less than 1 ppm for Pd. Platinum and palladium were separated from the primary leaching solution. The precipitate contained palladium and platinum in amounts of 0.067 g and 0.008 g, respectively.

EXAMPLE 6

To 50 ml of the nitric solution shown in EXAMPLE 4, 0.8 g of potassium permanganate was added (the molar ratio of $KMnO_4$ to the total nitrite ions coordinating with Pt and Pd: 1). The precipitate was filtered. The concentrations of elements in the filtrate were 400 g/l for Ag, 8 g/l for Cu, less than 1 ppm for Pt, and less than 1 ppm for Pd. The precipitate contained palladium and platinum in amounts of 0.0175 g and 0.002 g, respectively.

EXAMPLE 7

To 10 g of the primary leaching residue of crude silver, 100 ml of 0.5-N hydrochloric acid, and 5 g of sodium hydroxide were added (pH=1). Next, 2 g of oxalic acid was added, and these were allowed to stand for reaction at 80° C. for 1 hour. The leaching solution was filtered. Metal concentrations in the primary leaching residue and the filtrate (secondary leaching solution) are shown in Table 1. Another filtrate was prepared by adding 100 ml of 0.5-N hydrochloric acid, by adjusting the pH of the solution to 1, by adding oxalic acid, and by filtering. The filtrate had similar metal concentrations.

To the residue, 90 ml of hydrochloric acid containing hydrogen peroxide ($H_2O_2$ concentration 4%) was added for chlorination dissolution. The metal concentrations in the leaching solution (tertiary leaching solution) are shown in Table 1 for comparison. Further, 5.2 g of sodium hydroxide was added to 84 ml of the leaching solution to adjust the pH to 1, and 7 g of oxalic acid was added. The solution was allowed to react at 80° C. for 1 hour to precipitate by reduction gold in the solution. The amount of precipitated sold was 6.2 g, and had a purity of 99.99% or more.

TABLE 1

| (EXAMPLE 7) | | | | | | |
|---|---|---|---|---|---|---|
| | Au | Ag | Mn | Cu | Pd | Pt |
| Primary leaching residue | 70% | 6.5% | 6.5% | 12% | 4% | 0.4% |
| Secondary leaching solution | 13 ppm | 500 ppm | 6.3 g/l | 12 g/l | 3.9 g/l | 0.38 g/l |
| Tertiary leaching solution | 70 g/l | 200 ppm | 2 ppm | <1 ppm | 5 ppm | 3 ppm |

EXAMPLE 8

As in EXAMPLE 4, 10 g of the leaching residue of the crude silver was subjected to chlorination dissolution except that 100 ml of 2-N hydrochloric acid containing 2 g of oxalic acid was used as a dissolving solution. The solution was filtered. The metal concentrations of the filtrate (secondary leaching solution) are shown in Table 2. The residue was subjected to chlorination dissolution as in EXAMPLE 4. The metal concentrations of the leaching solution (tertiary leaching solution) are shown in Table 2 for comparison. Next, 90 ml of the leaching solution was subjected to reduction treatment, and 5.7 g of gold with a purity of 99.99% or more was obtained.

TABLE 2

| (EXAMPLE 8) | | | | | | |
|---|---|---|---|---|---|---|
| | Au | Ag | Mn | Cu | Pd | Pt |
| Primary leaching residue | 70% | 6.5% | 6.5% | 12% | 4% | 0.4% |
| Secondary leaching solution | 2.5 g/l | 500 ppm | 6.3 g/l | 12 g/l | 3.5 g/l | 0.3 g/l |
| Tertiary leaching solution | 67.2 g/l | 200 ppm | 2 ppm | <1 ppm | 5 ppm | 3 ppm |

EXAMPLE 9

Prior to filtering the residue, 10 g of silver anode slime was subjected to primary leaching with nitric acid, and potassium permanganate was added for oxidation. To 5 g of the residue, 100 ml of a 0.5-N hydrochloric acid solution containing 5 g of sodium hydroxide (pH=1) and then 2 g of oxalic acid were added, and allowed to react at 80° C. for 1 hour for secondary leaching. The solution was filtered. Metal concentrations of the anode slime and the filtrate (secondary leaching solution) are shown in Table 3. To the primary leaching residue, 100 ml of 0.5-N hydrochloric acid was added and the pH of the solution was adjusted to 1. Oxalic acid was added, and the solution was filtered. The metal concentrations in the filtrate also had similar values.

The residue was subjected to chlorination dissolution by adding 100 ml of hydrochloric acid containing hydrogen peroxide ($H_2O_2$ concentration 2.5%). The metal concentrations of the leaching solution (tertiary leaching solution) are also shown in Table 3 for comparison. Further, 5 g of sodium hydroxide was added to 90 ml of the leaching solution to adjust the pH to 1, and 7 g of oxalic acid was added. The solution was allowed to react at 80° C. for 1 hour. Gold in the solution was deposited by reduction. The quantity of the deposited gold was 3.8 g and the purity was 99.99% or more.

TABLE 3

(EXAMPLE 9)

|  | Au | Ag | Mn | Cu | Pd | Pt |
|---|---|---|---|---|---|---|
| Anode slime | 45% | 24% | — | 12% | 2% | 0.15% |
| Secondary leaching solution | 7 ppm | 230 ppm | — | 12 g/l | 1.8 g/l | 150 ppm |
| Primary leaching solution | 44.6 g/l | 200 ppm | — | <1 ppm | 5 ppm | 3 ppm |

COMPARATIVE EXAMPLE 1

Using 100 ml of 2-N hydrochloric acid not containing oxalic acid as a dissolving solution as in EXAMPLE 4, 10 g of the primary leaching residue was dissolved by chlorination. The metal concentrations of the filtrate (secondary leaching solution) are shown in Table 4. The residue was subjected to chlorination dissolution as in EXAMPLE 4. The metal concentrations of the filtrate (tertiary leaching solution) are also shown in Table 4 for comparison.

Although this example uses the leaching residue of the crude silver of EXAMPLE 4, as shown in Table 4, the secondary leaching solution contains a high content of gold compared with EXAMPLE 4, whereas the tertiary leaching solution contains a low content of gold. Thus, the recovery of gold is low.

TABLE 4

(COMPARATIVE EXAMPLE 1)

|  | Au | Ag | Mn | Cu | Pd | Pt |
|---|---|---|---|---|---|---|
| Primary leaching residue | 70% | 6.5% | 6.5% | 12% | 4% | 0.4% |
| Secondary leaching solution | 7.1 g/l | 500 ppm | 6.3 g/l | 12 g/l | 3.9 g/l | 0.38 g/l |
| Tertiary leaching solution | 37.3 g/l | 200 ppm | 2 ppm | <1 ppm | 5 ppm | 3 ppm |

COMPARATIVE EXAMPLE 2

Using 100 ml of 1-N sulfuric acid as a dissolving solution as in EXAMPLE 4, 10 g of the primary leaching residue was subjected to secondary leaching, and the solution was filtered. The metal concentrations of the filtrate (secondary leaching solution) are shown in Table 5. The residue was subjected to chlorination dissolution as in EXAMPLE 4. The metal concentrations of the filtrate (tertiary leaching solution) are also shown in Table 5 for comparison.

Although this example uses the leaching residue of the crude silver of EXAMPLE 4, as shown in Table 5, the secondary leaching solution contains low contents of platinum and palladium compared with EXAMPLE 4, whereas the tertiary leaching solution contains significantly high contents of platinum and palladium. Thus, the separation of platinum and palladium from gold is insufficient.

TABLE 5

(COMPARATIVE EXAMPLE 2)

|  | Au | Ag | Mn | Cu | Pd | Pt |
|---|---|---|---|---|---|---|
| Primary leaching residue | 70% | 6.5% | 6.5% | 12% | 4% | 0.4% |
| Secondary leaching solution | <1 ppm | 1.5 g/l | 2.3 g/l | 12 g/l | 10 ppm | 3 ppm |
| Tertiary leaching solution | 70 g/l | 200 ppm | 2 ppm | <1 ppm | 460 ppm | 30 ppm |

INDUSTRIAL APPLICABILITY

The refining method in accordance with the present invention, being different from conventional methods, does not require a step for casting crude silver into an anode in the electrolytic purification of the crude silver. Thus, high-purity silver can be readily obtained. Since metallic impurities, such as selenium, tellurium, bismuth, copper, and lead, can be effectively removed when the leaching solution is purified, slime containing large amounts of impurities is satisfactorily treated.

The refining method in accordance with the present invention has a gold extraction treating system, as well as a silver electrolytic decomposition system, in a preferred embodiment. Thus, gold can be recovered during the purification of silver, resulting in a significant reduction of the refining time. For example, the refining time can be reduced by approximately 20 days compared with conventional refining methods in which gold is recovered after refining silver. Since the refining step is simplified, operators can be reduced compared with conventional methods.

What is claimed is:

1. A method for refining noble metals comprising the following steps in order:

(1) dissolving crude silver, wherein said crude silver contains silver, compounds of metallic impurities that include platinum elements, and optionally gold, with nitric acid to form a solution containing silver nitrate, (2) adding an oxidizing agent to the solution to precipitate said compounds of platinum elements from the solution and then filtering said precipitate from the solution, (3) adding lime to the solution to precipitate additional metallic impurities and then removing said precipitate from the solution, (4) subjecting the solution to electrolytic decomposition to precipitate silver from the solution and then removing said precipitate from the solution, (5) adding sulfuric acid to the solution to precipitate calcium therein as gypsum and then removing said gypsum from the solution, and (6) recycling the solution to step (1).

2. The method for refining noble metals according to claim 1, wherein said platinum elements include platinum and palladium, and wherein potassium permanganate is used as the oxidizing agent to precipitate platinum elements in a molar amount corresponding to 6 to 24 times that of platinum in the solution of step (2), a molar amount corresponding to 4 to 16 times that of palladium, or a molar amount corresponding to the sum of these molar amounts of contained platinum and palladium.

3. The method for refining noble metals according to claim 1, wherein said metallic impurities include tellurium and/or bismuth, and copper, and wherein said method additionally comprises adding an iron compound into the solution during step (3) to precipitate tellurium and/or bismuth and iron hydroxide in the solution with a pH of less than 3 to 4 and then to remove copper in the solution with a pH of 4 to 5 by precipitating as copper hydroxide.

4. The method for refining noble metals according to claim 1, wherein said compounds of metallic impurities include gold, and which method additionally comprises dissolving the filtered precipitate containing compounds of said platinum elements of step (2), wherein said precipitate also contains said gold, by chlorination, and then recovering said gold.

5. The method for refining noble metals according to claim 4, wherein said recovering said gold is by solvent leaching.

6. The method for refining noble metals according to claim 4, wherein said chlorination is in the presence of oxalic acid with an acid concentration of 0.1 N to 1 N to separate said platinum elements by leaching, while dissolving the residue of said leaching by chlorination to leach gold and then adding a reducing agent for reductive precipitation of gold.

7. The method for refining noble metals according to claim 6, wherein said chlorination in the presence of the oxalic acid is performed using oxalic acid and hydrochloric acid containing sodium chloride, said chlorination to leach gold is performed using hydrogen peroxide with hydrochloric acid, gaseous chlorine with hydrochloric acid, or hypochlorous acid, and wherein said reducing agent is oxalic acid.

8. The method for refining noble metals according to claim 1, wherein the crude silver is obtained from slime of copper electrolytic decomposition or lead electrolytic decomposition or obtained by dry refining.

* * * * *